(12) United States Patent
Baek et al.

(10) Patent No.: US 7,874,715 B2
(45) Date of Patent: Jan. 25, 2011

(54) LIGHT EMITTING DIODE BACK LIGHT UNIT

(75) Inventors: Chang Hoon Baek, Gyunggi-do (KR); Sang Yun Lee, Gyunggi-do (KR)

(73) Assignee: Samsung LED Co., Ltd., Gyunggi-Do (KR)

(*) Notice: Subject to any disclaimer, the term of this patent is extended or adjusted under 35 U.S.C. 154(b) by 53 days.

(21) Appl. No.: 11/797,799

(22) Filed: May 8, 2007

(65) Prior Publication Data

US 2007/0258266 A1 Nov. 8, 2007

(30) Foreign Application Priority Data

May 8, 2006 (KR) ........................ 10-2006-0041136

(51) Int. Cl.
*F21V 7/04* (2006.01)

(52) U.S. Cl. .................. 362/612; 345/102; 345/207; 349/61; 349/68; 362/613

(58) Field of Classification Search ............. 362/612, 362/249.01, 613; 257/80; 345/102, 207; 349/61, 68
See application file for complete search history.

(56) References Cited

U.S. PATENT DOCUMENTS 7,303,288 B2 * 12/2007 Miyazawa et al. .......... 353/94
7,333,165 B2 * 2/2008 Nakano et al. ............. 349/68

FOREIGN PATENT DOCUMENTS

| JP | 2002-100486 | 4/2002 |
|----|---|---|
| JP | 2006-030309 | 2/2006 |
| KR | 10-2002-0084125 A | 11/2002 |
| KR | 10-2005-0030123 A | 3/2005 |
| KR | 10-2005-0112656 A | 12/2005 |
| KR | 10-2005-0115043 A | 12/2005 |

OTHER PUBLICATIONS

Korean Office Action, with English Translation, issued in corresponding Korean Patent Application No. KR 10-2006-0041136, dated on Jun. 29, 2007.
Japanese Office Action issued in Japanese Patent Application No. JP 2007-121543 dated Nov. 17, 2009.
Japanese Office Action issued in Japanese Patent Application No. JP 2007-121543 dated Aug. 31, 2010.

* cited by examiner

*Primary Examiner*—Victor A Mandala
*Assistant Examiner*—Whitney Moore
(74) *Attorney, Agent, or Firm*—McDermott Will & Emery LLP

(57) ABSTRACT

A light emitting diode backlight (LED) unit includes: a substrate having a plurality of divided areas; a plurality of LEDs disposed on the substrate; and an LED driver supplying a drive power to the plurality of LEDs disposed in at least two of the plurality of divided areas, wherein at least a part of the plurality of LEDs disposed in one of the plurality of divided areas is electrically connected to each other.

7 Claims, 3 Drawing Sheets

LIGHT EMITTING DIODE BACK LIGHT UNIT

CLAIM OF PRIORITY

This application claims the benefit of Korean Patent Application No. 2006-0041136 filed on May 8, 2006, in the Korean Intellectual Property Office, the disclosure of which is incorporated herein by reference.

BACKGROUND OF THE INVENTION

1. Field of the Invention

The present invention relates to a backlight unit including light emitting diodes (LEDs) as light source, and more particularly, to an LED backlight unit in which the entire LED driver supplying a drive power for driving LEDs is embodied by one drive board.

2. Description of the Related Art

In general, since a cold cathode fluorescent lamp (CCFL) used for a light source of a backlight of a liquid crystal display (LCD) uses mercury gas, environmental pollution may be caused, response speed is low, color reproduction characteristics is low, and it is difficult to reduce weight, thickness, and size of an LCD panel.

On the other hand, light emitting diodes (LEDs) are environmental, have a high response speed of several nano seconds, are effective on a video signal stream, can be impulsively driven, have color reproduction characteristics of 100%, whose brightness and color temperature can be freely changed by controlling the amount of light of red, green, and blue LEDs, and have advantages on the reducing weight, thickness, and size of an LCD panel. Therefore, currently, LEDs are positively employed for a light source of a backlight of an LCD panel.

Generally, an LED backlight unit employing LEDs for a light source may be divided into an edge type backlight unit and a vertical type backlight unit, depending on a position of the light source. The edge type backlight unit has a bar shaped light source located on a side of light guide plate and emitting light to the front surface of an LCD via the light guide plate. On the other hand, the vertical type backlight unit has a flat fluorescent lamp (FFL) located below an LCD, having a size identical with the LCD, and emitting light to a front surface of the LCD directly. Generally, when the vertical type backlight unit is employed to an LCD having a wide area such as a large LCD TV, an entire area of the LCD is divided into a plurality of areas and an LED backlight unit driving LEDs separately from each other is employed for each divided area.

FIG. 1 is a schematic diagram illustrating a conventional LED backlight unit 100. Referring to FIG. 1, the LED backlight unit 100 includes a substrate 110 having a plurality of divided areas, a plurality of LEDs 111 of red, green, and blue, disposed on the substrate 110, and a plurality of LED drivers 121 driving the plurality of LEDs 111.

One of the plurality of LED drivers 121 is electrically connected to the plurality of LEDs to drive the plurality of LEDs of red, green, and blue, installed in one of the plurality of divided areas. Also, the one LED driver 121 includes a red LED drive circuit 121a driving red LEDs, a green LED drive circuit 121b driving green LEDs, and a blue LED drive circuit 121c driving blue LEDs. In FIG. 1, an arrow formed of a solid line connecting each of the plurality of LED drivers 121 with each of the plurality of divided areas of the substrate 110 shows a divided area including LEDs driven by a corresponding LED driver.

The conventional LED backlight unit 100 requires the LED drivers 121 whose number is identical with the number of the divided areas of the substrate 110. Accordingly, since a conventional LED backlight unit requires a large number of LED drivers, the number of electric-electronic parts for embodying LED drivers increases, thereby enlarging an area of a drive board for mounting the electric-electronic parts. Therefore, the manufacturing cost of LED backlight units increases and the size of LED backlight units increases. Also, since a conventional LED backlight unit has to control a large number of LED drivers, complication of control for driving LEDs increases.

SUMMARY OF THE INVENTION

An aspect of the present invention provides an LED backlight unit in which one LED driver drives pluralities of red, green, and blue LEDs disposed in a plurality of divided areas on a substrate, thereby reducing the manufacturing cost of the LED backlight unit and simplifying control for driving LEDs.

According to an aspect of the present invention, there is provided a light emitting diode backlight (LED) unit including: a substrate having a plurality of divided areas; a plurality of LEDs disposed on the substrate; and an LED driver supplying a drive power to the plurality of LEDs disposed in at least two of the plurality of divided areas, wherein at least a part of the plurality of LEDs disposed in one of the plurality of divided areas is electrically connected to each other.

The LED backlight unit may further include: a sensor portion detecting an amount of light emitted by the plurality of LEDs; and a controller comparing the light amount detected by the sensor portion with a previously determined reference light amount and controlling the drive power supplied to the plurality of LEDs according to a result of the comparison.

The LED driver may include a pulse width modulation (PWM) driving portion determining a size of the drive power supplied to the LEDs by switching a power supply on/off and the controller controls the drive power by determining an on/off switching duty ratio of the PWM driving portion.

The plurality of LEDs may include: a plurality of red LEDs emitting red light; a plurality of green LEDs emitting green light; and a plurality of blue LEDs emitting blue light, in which mutual electrical connection is formed between LEDs whose color of lights are identical with each other.

The LED driver may include: a red LED drive circuit supplying a drive power to the plurality of red LEDs; a green LED drive circuit supplying a drive power to the plurality of green LEDs; and a blue LED drive circuit supplying a drive power to the plurality of blue LEDs.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1:
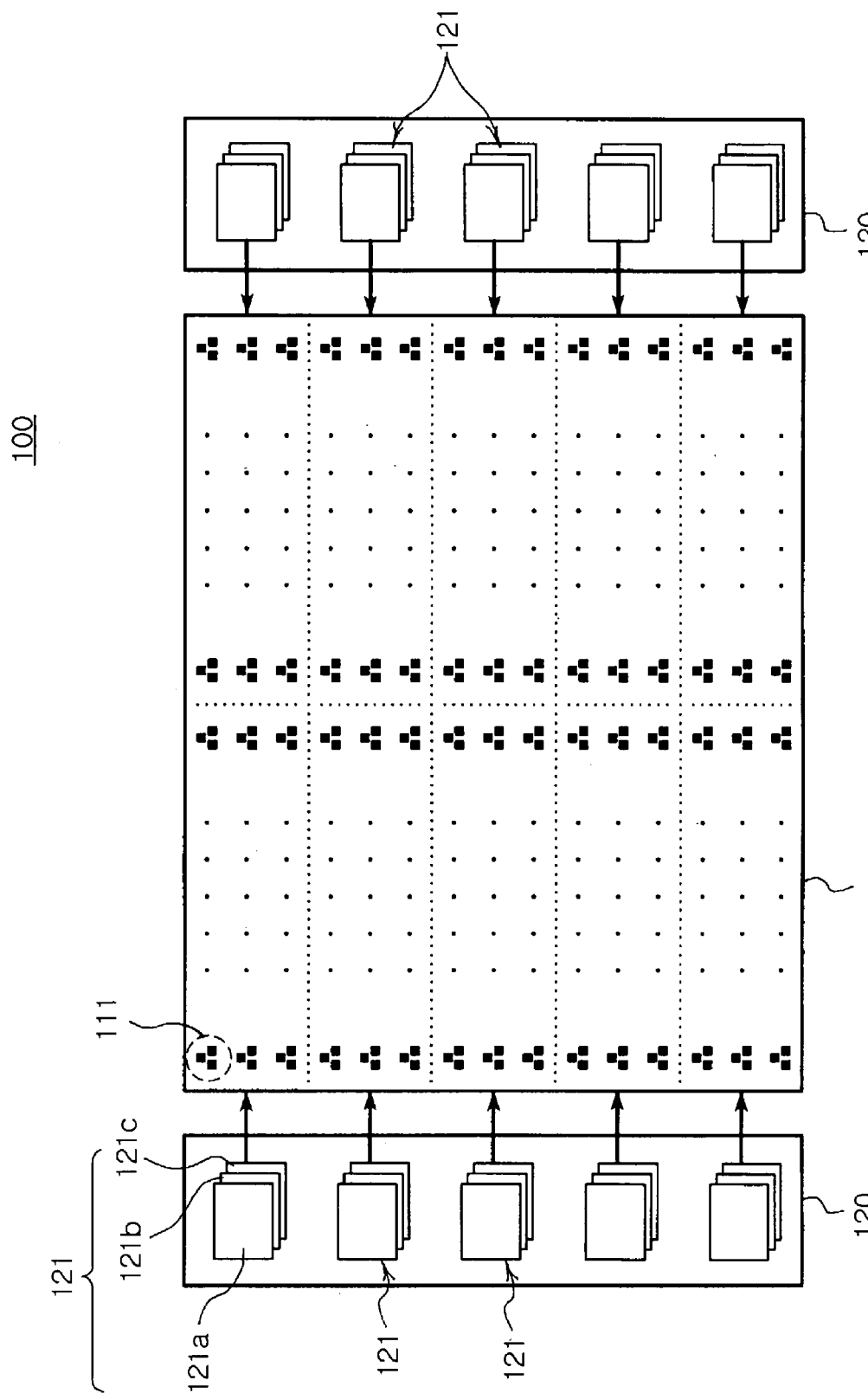
FIG. 1 is a schematic diagram illustrating a conventional LED backlight unit.
Figure 2:
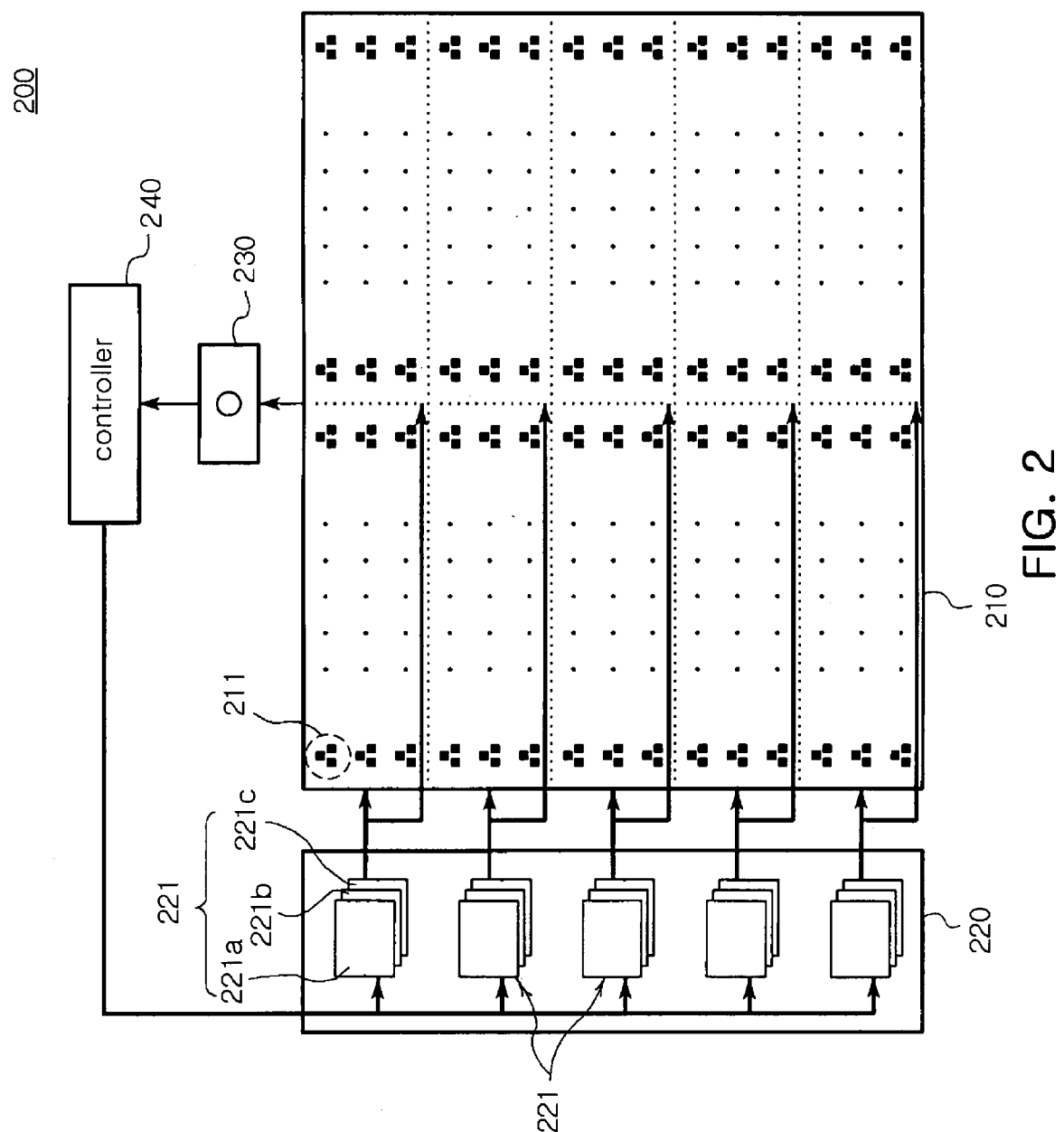
FIG. 2 is a schematic diagram illustrating an LED backlight unit according to an embodiment of the present invention.

FIG. 2 is a schematic diagram illustrating an LED backlight unit 200 according to an exemplary embodiment of the present invention. Referring to FIG. 2, the LED backlight unit 200 includes a substrate 210, a plurality of LEDs 211, and LED drivers 221.

The substrate 210 includes a plurality of divided areas. In FIG. 2, the plurality of divided areas is divided from each other by a dotted line. The plurality of LEDs 211 is disposed on the substrate 210. A metal core printed circuit board (MCPCB) generally used in an LED backlight may be used as the substrate 210. The MCPCB is a PCB in which an insulating plate formed on a top and bottom surface of a core formed of a metal such as Al and has characteristics of easily emitting heat when a large number of LEDs emitting a large amount of heat is mounted on the MCPCB. Also, since a big sized substrate may be weak to external shocks or heat, the substrate 210 may be manufactured to be separated from each other for each divided area.

On the other hand, a substrate employed by a vertical type backlight unit may have an area approximately identical with an LCD panel (not shown) and a substrate employed by an edge type backlight unit may have an area approximately identical with an incidence side of a light guide plate (not shown). Though FIG. 2 illustrates an example of the vertical type backlight unit, the present invention is not limited to the vertical type backlight unit.

The plurality of LEDs 211 is disposed on the substrate 210, and at least a part of the plurality of LEDs 211 may be electrically connected to each other by a conductive pattern (not shown) formed on the substrate 210. The same number of the LEDs 211 may be disposed in each of the plurality of divided areas, and at least a part of the LEDs disposed in one divided area may be electrically connected to each other.

For example, the LEDs 211 may be formed of white LEDs itself emitting white light. The LEDs 2211 may include a red LED, a green LED, and a blue LED, emitting red light, green light, and blue light, respectively, and generate white light by mixing light of red, green, and blue. When generating white light by using red, green, and blue LEDs, red LEDs, green LEDs, and blue LEDs included in the each divided area may be identical with each other for each color.

When supplying white light by using red, green, and blue LEDs, the quality of the white light is better than white light supplied by using white LEDs emitting white light. This is, when driving red, green, and blue LEDs by using an individual drive circuit, the shade of each color may be controlled individually, thereby generating white light having a desired color tone and color temperature.

Generally, since it has been known that white light includes green light more than red light and blue light, a number of green LEDs emitting green light may be larger than a number of red LEDs or a number of blue LEDs to embody good quality white light. For example, LEDs may be provided to make a ratio of red LEDs, green LEDs, and blue LEDs be 1:2:1.

The red LEDs, green LEDs, and blue LEDs may be disposed in a divided area of a substrate to be electrically connected to each other with a previously determined connection configuration for each color. For example, the red LEDs, green LEDs, and blue LEDs may form one of a serial connection configuration and a parallel connection configuration between LEDs of the same color in the divided area of the substrate and may be connected by mixing the serial connection configuration and parallel connection configuration. Also, a connection configuration formed between LEDs of the same color in the divided area of the substrate may be connected to a connection configuration of LEDs disposed in another divided area.

The LED driver 221 supplies a drive power to the LEDs 211 to emit light. When the LEDs 211 includes red, green, and blue LEDs, the LED driver 221 may include a red drive circuit 221a supplying a drive power to the red LED, a green drive circuit 221b supplying a drive power to the green LED, and a blue drive circuit 221c supplying a drive power to the blue LED. According to an embodiment of the present invention, the LED drivers 221 supply a drive power to the plurality of LEDs 211 disposed in at least two divided areas, respectively. For example, as shown in FIG. 2, the LED driver 221 may drive red, green, and blue LEDs disposed in the two divided areas adjacent to each other. In FIG. 2, an arrow formed of a solid line connecting each of the LED drivers 221 with the divided area of the substrate 210 indicates that the power is supplied to LEDs disposed in the divided areas indicated by the arrow. The technical meaning of the arrow will be applied to the contents that will be described referring to FIG. 3.

Referring to FIG. 2, the plurality of red, green, and blue LEDs 211 disposed in the two divided areas and driven by the LED driver 221 have an electrical connection between LEDs emitting the same light in each of the divided areas. An LED connection configuration formed in the each of the two divided areas may be connected with each other in series or in parallel and electrically connected to one LED driver 221. For example, the LEDs disposed in the each of the divided areas may form a serial connection configuration between the LEDs emitting the same light, and the serial connection configurations disposed in the different two divided areas, respectively, may be connected to each other in parallel and electrically connected to an LED driver circuit corresponding to the color.

As described above, since the one LED driver 221 drives the plurality of LEDs 211 disposed in the at least two divided areas, a number of the LED drivers 221 may be reduced to a half of a conventional LED driver. Also, since the number of the LED drivers is reduced, the entire of a plurality of the LED drivers 221 may be easily mounted on one drive board 220. Accordingly, considering a conventional LED backlight unit including LED drivers mounted on at least two drive boards, a number of drive boards may be reduced to be one, thereby reducing the manufacturing cost of a drive board.

On the other hand, the LED driver 221 may include a PWM driving portion determining a size of the drive power supplied to the LEDs 211 by switching a power supplied from the outside. The power is supplied by a switching mode power supply (SMPS) previous to the LED driver 221, and the LED driver 221 receives the power and converts and supplies the power to a drive power appropriate for driving LEDs to the LEDs. The PWM driving portion converts the power to the drive power by switching on/off according to a previously determined duty ratio to output the appropriate drive power. The duty ratio may be a previously determined and fixed value and may be changed by a controller 240 that will be described later.

According to an embodiment of the present invention, a number of LED drivers may be reduced, a number of electric and electronic parts for embodying the LED drivers may be reduced, and power consumed by each of electric and electronic parts of the LED driver may be reduced.

The LED backlight unit 200 according to an embodiment of the present invention may further include a sensor portion 230 detecting an amount of light emitted by the plurality of LEDs and the controller 240 comparing the light amount detected by the sensor portion 230 with a previously determined reference light amount and controlling a drive power supplied from the LED driver 221 to the LEDs 211 according to a result of the comparison.

The sensor portion 230 detects the amount of light emitted by the LEDs 211. When the LEDs 211 include red, green, and blue LEDs, the sensor portion 230 may detect light amounts of red, green, and blue LEDs for each color. Though the sensor portion 230 may include a plurality of port transistors detecting the light amounts of red, green, and blue LEDs, the present invention is not limited to this configuration and the sensor portion 230 may be formed of various sensors capable of detecting a light amount. The sensor portion 230 may be formed of a plurality of sensors to detect amounts of light emitted LEDs disposed in the divided areas, respectively, for each divided area. However, it may complicate circuits of a sensor portion that each of a plurality of sensors detects a light amount. When each of the divided areas has an LED arrangement configuration substantially identical with each other, a difference between amounts of light emitted from the divided areas, respectively, is very small. The sensor 230 may detect an amount of light emitted from LEDs disposed in at least a part of the plurality of divided areas.

The controller 240 compares the light amount of the LEDs 211, detected by the sensor portion 230, with the previously determined reference light amount and controls the drive power outputted from the LED driver 221 to emit the reference light amount by using the LEDs 211 according to the result of the comparison.

Generally, an LED emits an amount of light, varying with external environments such as a temperature, a drive voltage, and a drive current and a variation amount is changed according to a kind of the LED. Accordingly, to provide uniform white light, it is important that red light, green light, and blue light emitted from red, green, and blue LEDs, respectively, are uniform. To provide the uniform white light, the sensor portion 230 detects a light amount of the LEDs 211 and gives feedback to the controller 240 with respect to the detected light amount. The controller 240 compares the detected light amount with the previously determined reference light amount and transmits a control signal controlling the drive power outputted from the LED driver 221 to the LED driver 221 to make the light amount of the LEDs 211 identical with the reference light amount. When the LEDs 211 includes red, green, and blue LEDs, the controller 240 detects a light amount for each color, compares the light amount detected for each color with a reference light amount previously determined for each color, and transmits a control signal controlling a drive power supplied to LEDs for each color to the red, green, and blue drive circuits 221a, 221b, and 221c in the LED driver 221.

Generally, a light amount of an LED varies with a drive current. Namely, the light amount of the LED increases when the drive current is high and decreases when the drive current is low. Therefore, the light amount of the LED may be controlled by controlling the size of drive current under the same drive voltage and peripheral temperature.

Accordingly, the controller 240 transmits a control signal for controlling the size of the current for each of red, green, and blue LEDs 211 of each of the LED drivers 221, to each of the LED drivers 221. The controller 240 may transmit a control signal for changing the drive current outputted from the LED driver 221 according the light amount of each of the red, green, and blue LEDs 211, detected by the sensor portion 230.

The controller 240 may transmit a control signal for increasing the drive current to increase the light amount of the red, green, and blue LEDs 211 when the light amount of the red, green, and blue LEDs 211, detected by the sensor portion 230, is smaller than the previously determined reference light amount. The controller 240 may transmit a control signal for reducing the drive current to reduce the light amount of the red, green, and blue LEDs 211 when the detected light amount is larger than the reference light amount.

A value of one of the increased and reduced light amount of the red, green, and blue LEDs is detected by the sensor portion 230 again and the controller 240 receives feedback with respect to the value. The controller 240 transmits a control signal adjusted according to the light amount of the red, green, and blue LEDs 211, thereby maintaining a uniform light amount of the red, green, and blue LEDs 211.

On the other hand, as described above, when the LED driver 221 has a PWM driving portion switching a power supply on/off, the controller 240 may generate a control signal controlling a duty ratio of switching the power supply on and off of the PWM driving portion.

Generally, a size of a drive current of an LED may be controlled by the duty ratio of switching the power supply on and off of the PWM driving portion. Namely, the drive current increases when the duty ratio is large and decreases when the duty ratio is small. Therefore, the controller 240 may control the size of the drive current supplied by the LED driver 221 by determining the duty ratio according to a result of comparing a detected light amount with a reference light amount, thereby controlling the light amount of the LEDs 211.

For example, the controller 240 may increase the light amount of the red, green, and blue LEDs by transmitting a control signal for increasing the switching on/off duty ratio of the PWM driving portion in red, green, and blue LED drive circuits when the light amount of the red, green, and blue LEDs, detected by the sensor portion 230 is smaller than the previously determined reference light amount. When the detected light amount is larger than the reference light amount, the controller 240 may reduce the light amount of the red, green, and blue LEDs by transmitting a control signal for reducing the switching on/off duty ratio of the PWM driving portion in the red, green, and blue drive circuits.

Figure 3:
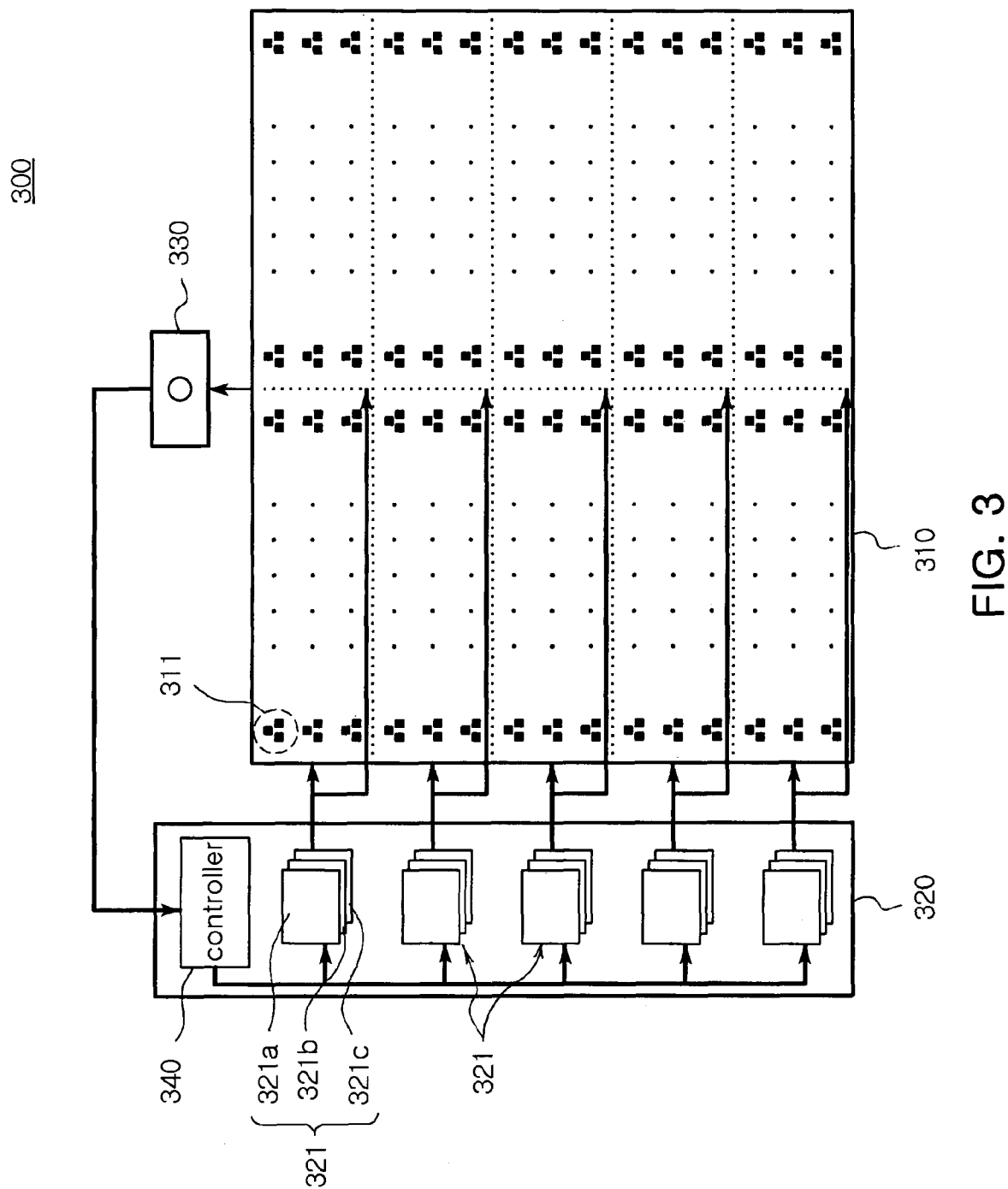
FIG. 3 is a schematic diagram illustrating an LED backlight unit according to another embodiment of the present invention.

FIG. 3 is a schematic diagram illustrating an LED backlight unit 300 according to another embodiment of the present invention. Referring to FIG. 3, similar to the LED backlight unit 200, the LED backlight unit 300 includes a substrate 310, a plurality of LEDs 311, a plurality of LED drivers 321, a sensor portion 330, and a controller 340.

One of the plurality of LED drivers 321 includes a red LED drive circuit 321a driving a red LED, a green LED drive circuit 321b driving a green LED, and a blue LED drive circuit 321c driving a blue LED. The plurality of LED drivers 321 may be embodied on one drive board 320. In the present embodiment, the controller 340 is embodied on the drive board 320 together with the plurality of LED drivers 321 without an additional substrate, thereby reducing the manufacturing cost of substrates.

As described above, according to an exemplary embodiment of the present invention, the number of LED drivers is reduced to embody all of LED drivers in one drive board, thereby reducing the manufacturing cost of drive boards.

Also, the number of LED drivers is reduced and a controller controlling LED drivers is simplified, thereby easily controlling LED drivers.

In addition, an additional substrate for mounting a controller is not required and the controller is mounted on a drive board on which LED drivers are mounted, thereby reducing the manufacturing cost of substrates.

What is claimed is:

1. A light emitting diode backlight unit comprising:
   a substrate having a plurality of divided areas, the divided areas of the substrate being separated spatially from one another;
   a plurality of light emitting diodes disposed on each divided area; and
   a light emitting diode driver electrically connected to the plurality of light emitting diodes disposed in at least two of the plurality of divided areas,
   wherein the plurality of light emitting diodes, disposed in the plurality of divided areas, are electrically connected to each other so as to form respective LED connection configurations,
   wherein the LED connection configurations, formed on one of the divided areas, is electrically connected in series or parallel with the LED connection configuration formed on another divided area, and
   wherein the LED connection configurations, connected to each other, receive drive power from the light emitting diode driver.

2. The light emitting diode backlight unit of claim 1, further comprising:
   a sensor portion detecting an amount of light emitted by the plurality of light emitting diodes; and
   a controller comparing the light amount detected by the sensor portion with a previously determined reference light amount and controlling the drive power supplied to the plurality of light emitting diodes according to a result of the comparison.

3. The light emitting diode backlight unit of claim 2, wherein the light emitting diode driver comprises a pulse width modulation driving portion determining a size of the drive power supplied to the light emitting diodes by switching a power supply on/off and the controller controls the drive power by determining an on/off switching duty ratio of the pulse width modulation driving portion.

4. The light emitting diode backlight unit of claim 1, wherein the plurality of light emitting diodes comprises:
   a plurality of red light emitting diodes emitting red light;
   a plurality of green light emitting diodes emitting green light; and
   a plurality of blue light emitting diodes emitting blue light,
   wherein mutual electrical connection is formed between light emitting diodes whose color of lights are identical with each other.

5. The light emitting diode backlight unit of claim 4, wherein the light emitting diode driver comprises:
   a red light emitting diode drive circuit supplying a drive power to the plurality of red light emitting diodes;
   a green light emitting diode drive circuit supplying a drive power to the plurality of green light emitting diodes; and
   a blue light emitting diode drive circuit supplying a drive power to the plurality of blue light emitting diodes.

6. The light emitting diode backlight unit of claim 1, further comprising:
   a sensor portion detecting an amount of light emitted by the plurality of light emitting diodes.

7. The light emitting diode backlight unit of claim 6, further comprising:
   a controller comparing the light amount detected by the sensor portion with a previously determined reference light amount and controlling the drive power supplied to the plurality of light emitting diodes according to a result of the comparison.

* * * * *